United States Patent
Burlina et al.

(10) Patent No.: US 12,231,674 B2
(45) Date of Patent: Feb. 18, 2025

(54) SYSTEMS AND METHODS FOR ENCODING AN IMAGE

(71) Applicant: Zoox, Inc., Foster City, CA (US)

(72) Inventors: Philippe Martin Burlina, Rockville, MD (US); Subhasis Das, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 32 days.

(21) Appl. No.: 18/101,851

(22) Filed: Jan. 26, 2023

(65) Prior Publication Data
US 2024/0259585 A1    Aug. 1, 2024

(51) Int. Cl.
*H04N 19/52*    (2014.01)
*G06V 10/26*    (2022.01)
*G06V 10/764*    (2022.01)
*G06V 10/77*    (2022.01)
*G06V 20/56*    (2022.01)

(52) U.S. Cl.
CPC ............ *H04N 19/52* (2014.11); *G06V 10/26* (2022.01); *G06V 10/764* (2022.01); *G06V 10/7715* (2022.01); *G06V 20/56* (2022.01)

(58) Field of Classification Search
None
See application file for complete search history.

(56) References Cited

U.S. PATENT DOCUMENTS

| | | | |
|---|---|---|---|
| 9,514,391 B2 | 12/2016 | Perronnin et al. | |
| 10,867,210 B2 | 12/2020 | Mao et al. | |
| 10,964,011 B2 | 3/2021 | Cosatto et al. | |
| 2011/0202277 A1* | 8/2011 | Haddad | G01S 13/9027 702/14 |
| 2013/0169779 A1* | 7/2013 | Pedersen | H04R 25/70 348/E7.085 |
| 2014/0105355 A1* | 4/2014 | Toimela | A61N 5/1064 382/132 |
| 2015/0324946 A1* | 11/2015 | Arce | G06K 19/06103 382/251 |
| 2018/0176576 A1* | 6/2018 | Rippel | G06N 3/08 |
| 2021/0042503 A1 | 2/2021 | Karras et al. | |
| 2021/0319544 A1* | 10/2021 | Santamaria-Pang | G06T 7/0002 |

(Continued)

FOREIGN PATENT DOCUMENTS

KR    10-2398408 B1    5/2022

OTHER PUBLICATIONS

International Search Report and Written Opinion dated May 10, 2024 for PCT Application No. PCT/US2024/011015.

*Primary Examiner* — Mohammad J Rahman
(74) *Attorney, Agent, or Firm* — EIP US LLP

(57) ABSTRACT

Techniques are described herein for encoding of an input data, to handle both variable bitrate requirements and varying importance of content of different portions of the input data. The encoding vectors may be based on a subset of data from the input data. Potential distortion in the reconstruction on a decoder side may be alleviated by transmitting a difference dataset as a complement to encoding vectors encoded from the input data. The difference dataset may be determined taking into account the importance of content of different portions of the input image to reduce the size, for example by masking out portion of the input data that is considered less important. The difference dataset may be compressed based on an available bandwidth.

20 Claims, 5 Drawing Sheets

(56) References Cited

U.S. PATENT DOCUMENTS

| | | | |
|---|---|---|---|
| 2022/0198199 A1* | 6/2022 | Thibaux | B60W 60/001 |
| 2023/0292647 A1* | 9/2023 | Bainbridge | G06V 20/188 |
| | | | 702/2 |
| 2023/0345030 A1* | 10/2023 | Rhyu | H04N 19/136 |
| 2024/0065540 A1* | 2/2024 | Commuri | G06T 7/0012 |

* cited by examiner

SYSTEMS AND METHODS FOR ENCODING AN IMAGE

BACKGROUND

A vehicle may include various sensors, which may be utilized for many different purposes. Sensor data produced by these sensors may need to be transmitted from the vehicle and stored for later analysis, mining, training of algorithms or for legal purposes, making digital encoding of various sensor data increasingly important. For example, high-efficiency image compression is needed to keep the quality that can be obtained from encoded images and video sequences while at the same time keeping the data rate to acceptable levels.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
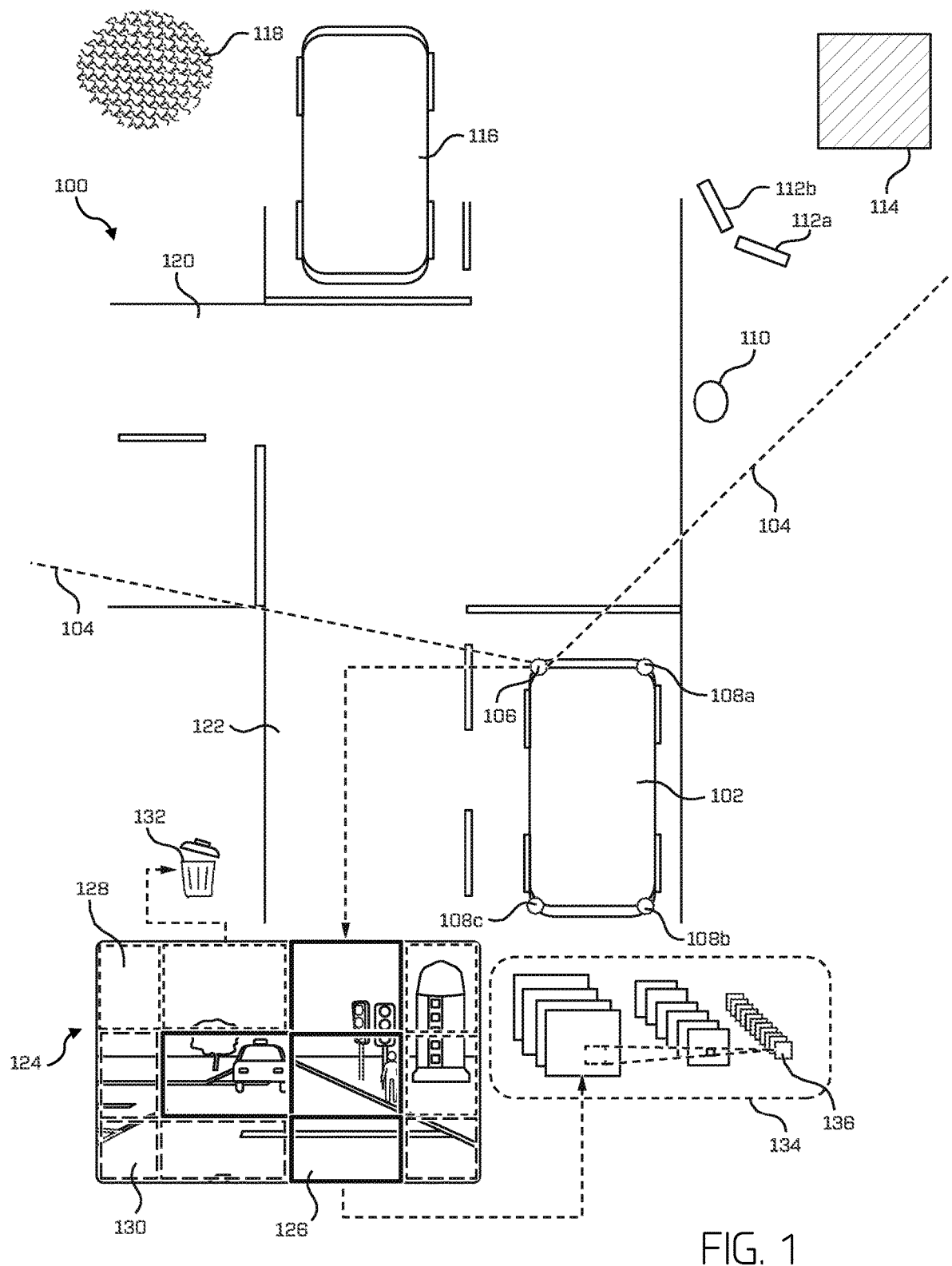
FIG. 1 is an example scenario including a vehicle.

This disclosure describes procedures, as well as methods, systems and computer-readable media for encoding image data using an encoder machine-learned (ML) model, for example a transformer type neural network architecture. A decoder ML model, such as a decoder of an encoder-decoder pair of the transformer, may be trained to reconstruct an image from only a subset of the image data, in the form of image patches, thereby facilitating an improved compression ratio when used to encode an image. Variable bitrate requirements can be met by selectively encoding a smaller or larger set of image patches into encoding vectors (also referred to as embedding vectors below). The set of image patches may be selected based on the image content of each image patch, such that less important patches (based on the context, for example facilitating autonomous driving) may be disregarded. Potential distortion in the reconstruction on a decoder side may be alleviated by transmitting a difference image as a complement to the embedding vectors encoded from the set of image patches. The difference image may be determined taking into account the importance of image content of different portions of the input image to reduce the size, for example by masking out portion of the image that is considered less important. The difference image may be compressed based on an available bandwidth. The techniques described herein may be used both for encoding of an individual image, as well as for encoding a video stream.

Certain vehicles, such as a fully or semi-autonomous vehicles (AV), may include one or more sensors, such as a light detection and ranging (LIDAR) sensor, radar sensor, cameras or microphones to gather information of the environment being traversed by the AV. Sensor data may for example comprise visual information (such as images), spatial information (such as point clouds) or temporal information (such as audio data) relating to the environment traversed by the AV. In some embodiments, a combination of different data may be treated as a single data, such as for example audiovisual data including both images/video and audio. The sensor data captured by the one or more sensors may be analyzed and used to control the AV. For example, sensor data may be analyzed to detect other vehicles, pedestrians, traffic direction features, road lanes, etc., in the environment. Even if the analysis for real time control of the AV may take place onboard the AV, sensor data (point cloud, audio, video, images) from the one or more sensors may need to be transmitted from the AV to e.g., an external server to be reconstructed and used for further analysis, data mining, to be used as training data for machine learning algorithms, or for legal purposes. The disclosed techniques may be used on vehicle (e.g., to compress data transferred between internal components). In some examples, the AV may request to be remotely controlled, e.g., via a teleoperator service, for example if the AV encounter a situation where a next action may not be safely determined in an autonomous fashion. In such examples, sensor data, such as image data from an onboard camera, may need to be transmitted to the remote operator of the vehicle. For any of the above reasons, as well for other reasons, sensor data may need to be transmitted from the AV to be reconstructed, e.g., at a remote device or service, such as a server or cloud computing service.

Not all sensor data captured by a sensor may be equally important, depending on the context in which the sensor data will be used. For example, in the context of an AV, video input from the vehicle's cameras may be used to detect and track objects in the environment, such as other vehicles, pedestrians, and traffic signs. This information may then be used by the vehicle's control system to make decisions about how to navigate the environment safely. However, the cameras may capture much more of the surroundings other than such objects, for example buildings, vegetation, the sky, etc., which are not as important for controlling the vehicle, and may be less important also for storing, remote analysis, for legal purposes etc.

An available bandwidth at a moving object, such as an AV, can be influenced by a number of factors. For example, if the AV is driving in an area with poor cellular coverage or a large number of other users accessing the network, the available bandwidth may be lower. One of the key factors that can influence the available bandwidth is the distance from the nearest cell tower. The closer the AV is to the cell tower, the stronger the signal may be, and the higher the available bandwidth may be. Additionally, the type of network technology being available in the area can also have an impact on the available bandwidth. For example, some network technologies, such as 4G and 5G, are capable of higher data transfer speeds than others, such as 3G.

Consequently, it may be advantageous to provide an encoding technique of sensor data that allows for a flexible bitrate of the transmitted data. Moreover, independently of an available bandwidth, it may be advantageous to provide an encoding technique that allows for improved compression to minimize transportation or transmission costs as well as reducing the storage needed to store the encoded data. Moreover, it may be advantageous to provide an encoding technique that allows for adaptive compression rate for different parts or portions of the sensor data, such as for example different parts of a scene depicted in an image. This may advantageously be achieved using an encoder ML model and a respective decoder ML model trained to allow an adaptive compression rate for different parts or portions of sensor data, e.g., different parts of a scene depicted in an image, captured by audio, represented by a point cloud, etc.

An example of such encoder-decoder ML model is a transformer, i.e., a deep learning model of a transformer type neural network architecture. Examples of suitable transformers include vision transformers (e.g., Vision Transformer (ViT), Permutation-based Vision Transformer (PVT), Distilled and quantized version of the vision transformer (DeiT)), transformer-based audio encoder (e.g., WaveGlow, WaveRNN, and the MelNet), and Point transformers.

A vision transformer is a type of artificial neural network (ANN) that is designed to process visual information. It is based on the transformer architecture, which was originally developed for natural language processing tasks. Unlike traditional convolutional neural networks (CNNs), which use multiple layers of small, local filters to extract features from images by using convolutions, vision transformers use an attention mechanism to learn global dependencies between different elements of an image. This allows the vision transformers to be more flexible and efficient at capturing complex, long-range relationships within an image. Another example of a suitable encoder-decoder ML model may be a recurrent neural networks (RNN) which also is designed to process sequential input data such as patches of an image.

Self-supervised learning is a powerful approach for training transformers, as it allows the model to learn useful representations from large amounts of unlabeled data. For example, a transformer encoder and decoder pair may be trained to reconstruct an image from a subset of image patches from images captured by an onboard camera of fully or semi-autonomous vehicles (AV), making the available amount of training data almost endless. Similar techniques may be used for audio transformers and point transformers. Moreover, since the transformer encoder-decoder pair can be trained to reconstruct e.g., an image from a subset of image patches from that image, in some examples only these sub image patches (also referred to as tokens) may need to be encoded and their resulting encoding vectors (embedding vectors) may be transmitted over the transmission channel, thereby achieving a substantial compression ratio.

In a transformer type neural network architecture, an embedding vector is a dense vector representation of a discrete input token (such as an image patch, patch of a point cloud, patch of an audio signal) that is used as input to the transformer model. These vectors are typically learned during the training process, and they encode the semantic meaning of the input tokens.

An image patch can be a small, local region of an image, such as 8*8 16*16 or 32*32 pixels. An image can be divided into image patches of different size or into image patches having a same size. An image may thus be divided into a grid of patches, and each patch may be processed independently. This may allow algorithms, such as the once described herein, to focus on local features in the image, rather than trying to process the entire image at once. For point clouds, a patch of a point cloud may refer to a subset of points within the point cloud that form a local region. These points may be chosen based on a certain criterion, such as proximity or similarity, and may be used for various tasks such as feature extraction, object recognition, and object tracking. A patch of an audio signal may refer to a subset of samples of an audio signal that form a local region. These samples may be chosen based on a certain criterion, such as time, frequency, or amplitude, and may be used for various tasks such as audio feature extraction, audio classification, and audio synthesis.

Potential distortion (e.g., due to a lossy nature of a decoder) in the reconstruction on a decoder side may be alleviated by transmitting a difference dataset (for example a difference image) as a complement to the embedding vectors encoded from the set of data patches. Using this technique, an input image may be encoded using two separate datasets, which increases flexibility of the choice of compression strategies as well as transmission strategies.

In examples, the techniques described herein are implemented on an AV. The AV may comprise a vehicle computing device(s) with processors configured to receive an input image from a camera of the AV. In other embodiments, the processor is part of a remote computing device which receives the image from the camera of the AV.

In examples, the techniques described herein are implemented on sensor data captured by at least one sensor of an autonomous vehicle. Such sensor data may comprise image data, video data, audio data, point clouds, etc.

According to examples, an input data may be divided up in a set of patches, where different patches may be encoded differently (or allocated more or less bits in the encoding process). In examples, a subset of patches is determined from the set of patches, and a set of encoding vectors associated with the subset of patches may be determined (computed) by the encoder ML model. In examples, the encoder ML model determines a set of encoding vectors comprising one or more encoding vectors based at least in part on an input data, where the encoding vectors are not associated with patches of the input data but instead determined using other suitable strategies. For example, image segmentation may be employed where different segments in the data are encoded into different encoding vectors.

There are several techniques that can be used to segment an data, and the most appropriate method will depend on the characteristics of the data and the specific goals of the segmentation process. Some techniques (exemplified below for an image, but can be used for other types of data mutatis mutandis) include:

Thresholding: This involves dividing the image into segments based on the intensity or colour of the pixels. For example, thresholding may be used to separate the foreground and background elements in an image, or to identify the outline of an object in an image.

Region-based segmentation: This technique involves dividing the image into segments based on the spatial characteristics of the pixels. For example, region-based segmentation may be used to divide an image into segments based on the shape or size of the objects in the image.

Clustering: This technique involves grouping pixels into segments based on similarity measures, such as colour or intensity. Clustering can be used to identify distinct objects or features in an image.

Edge detection: This involves identifying the boundaries or edges between different objects or regions in an image. Edge detection can be used to segment an image by tracing the outlines of objects in the image.

Machine learning: Machine learning algorithms, such as convolutional neural networks (CNNs), may be used to segment images. These algorithms can be trained on a dataset of labelled images to learn to identify and segment specific objects or features in new images.

Segmentation based on texture, wherein the texture is characterized by computing feature vectors. Example of feature vectors are based on statistical features or features computed using signal processing transforms (e.g., Fourier transform).

The selection process to determine the subset of patches may, in examples, be based on applying an data segmentation algorithm to the input data to detect a set of features in the data. At least some of the features may be classified, and the subset of patches may be determined based at least in part on the classified features. For example, an importance of data content of the patch may be determined based on a classification of a feature included in the patch. For example, an importance of a classification may be determined using a predefined lookup table, or by inputting one or more of the classifications into a ML model trained to determine the importance of a classification (possibly in the conjunction with the rest of the classifications and/or the input image and/or any other sensor data collected by the AV and/or map data relating to the position in an environment of the AV).

In examples, a patch may be labeled with one or more labels, where each label indicates image content of the patch. In some embodiments, such labeling is determined upstream from the encoder, for example using a perception component (as will be further described below) of the AV. The subset of patches from the set of patches may be determined based at least in part of the set of labels (e.g., segmentation labels). For example, a relative importance of the data content of a patch may be determined based at least in part on one or more labels associated with that patch. For example, an importance of a label may be determined using a predefined lookup table or any other type of heuristics, or by inputting one or more of the labels into a ML model trained to determine the importance of a classification. In other examples, importance of a data patch may be determined using other types of data relating to the input data. For example, in examples the input data is an image. Other types of data, such as audio data or map data may be used to determine portions of the image that have higher relevance compared to other portions of the image. In examples, audio may indicate a portion of the scene captured by the image where people or emergency vehicles are present. In these examples, image content corresponding to that portion of the scene may be considered important. For example, a microphone may be able to capture audio of an approaching emergency vehicle before the camera capture image data corresponding to the emergency vehicle. Consequently, the algorithm may take into account events taking place beyond line of sight. Examples of how to determine events beyond line of sights is described in U.S. application Ser. No. 16/661,898 (titled "EMERGENCY VEHICLE DETECTION" and filed Oct. 23, 2019) now issued as U.S. Pat. No. 11,322,019 which is incorporated herein by reference in its entirety for all purposes.

In other examples, map data may indicate portions of the scene captured by an image which corresponds to buildings or vegetation which may be considered less important. In examples, importance may also depend on other sensor data such as e.g., speed of movement of objects in an image patch which may mean that a higher bit rate is needed to capture the movement of the objects in the encoded data.

In case a determined level of importance for a patch meeting or exceeding a defined threshold, the patch may be included in the subset of patches.

In some examples, using the encoding vectors alone may not allow a reconstructed image of sufficient quality to be decoded at a decoder side. Using fewer encoding vectors and/or selecting fewer patches to be encoded into encoding vectors may increase the distortion in the reconstructed image at the decoder side. Potential distortion in the reconstruction on a decoder side may be alleviated by determining a difference dataset (such as a difference image) as a complement to the encoding vectors. The difference data set may be determined by determining, by a decoder ML model (e.g., at the AV) and based at least in part on the set of encoding vectors, a reconstructed image. The reconstructed image may then be compared with the input image, and based on the comparison, a difference dataset between the reconstructed image and the input image may be determined. For example, the input image may be subtracted from the reconstructed image.

As described above, some parts of an data may be considered as unimportant for a specific situation of an AV. Such parts, or the patches of the data containing such parts may in examples not be encoded by an encoding vector and thus not used for determining the set of encoding vectors. In examples, at least some of such parts (patches, segments, etc.) may also result in masked portions in the difference dataset. A masked portion may refer to one of:
  a subset of the difference dataset being an empty set,
  a subset of the difference dataset with predefined data, such as e.g., a predefined color (white, black, etc.),
  a subset of the difference dataset comprising data corresponding to a lossy version of input data of the one or more patches to be masked.

A lossy version of data refers to a representation of data that may have lost some of its original information during the process of compression or encoding. This is in contrast to a lossless version, which retains all of the original information. Examples of lossy versions of data include blurred image data, smoothened point cloud data, etc.

A masked portion in the difference dataset may reduce the bitrate of the difference dataset when encoded and transmitted. For example, it may require less data to encode a blurred version of image data compared to the original image data, due to less details in the blurred version.

The masked portions of the difference data set may be determined using different approaches. For example, as described above, a patch may be labeled with one or more labels, where each label indicates data content of the patch. The labels may be used to determine the one or more patches to be masked. For example, for a patch from the set of patches, based at least in part on a label associated with the patch, a level of importance of data content of said patch may be determined. The level of importance may indicate an importance of the image content of said patch for controlling an autonomous vehicle. The level of importance is determined by inputting one or more labels associated with the patch into a detection model configured to classify a level of importance based at least in part on one or more labels, wherein the detection model is one of: a ML model and a heuristics engine. The detection model may thus be configured/trained to return a level of importance based at least in part on the labels. Further data such as an input image and/or any other sensor data collected by the AV and/or map data relating to the position in an environment of the AV may be used as input to the detection model. The detection model may be trained using historic data (e.g., gathered by an AV) that may be manually or automatically labeled with an importance level.

In other examples, the masked portions of the difference data set may be determined by applying an data segmentation algorithm to the input image to detect a set of features in the image, classify at least some features of the detected set of features, and determining the one or more data patches (e.g., image regions, image portions, etc.) to be masked based at least in part of the classified features. For example, an image patch or image segment comprising only or mostly the sky, or vegetation, may be considered as unimportant and thus suitable for being masked as described herein.

In some examples, a masked portion in the different dataset may also be used to mask portions of the input data for privacy, e.g., faces, license plates, speech, etc. In these examples, the determining importance of the portions of the input data may also be based on privacy considerations such that such portions of the input data are masked, e.g., by blurring faces in an image, or masking out speech in an audio signal. Such features may be determined via classification or segmentation techniques as disclosed herein.

In examples, first data may be determined based at least in part on the set of encoding vectors. The encoding vectors may be further encoded/compressed. The compression may be lossy, e.g., via vector quantization, and lossless, e.g., via entropy coding. Consequently, bit rate for transmission of the encoding vectors (represented by the first data) may be lowered.

There exist several applicable entropy coding algorithms, including Huffman coding, arithmetic coding, and Lempel-Ziv-Welch (LZW) coding. These algorithms work by constructing a code tree or table, which maps each symbol in the data to a unique code, and then using this code to represent the data. The encoding vectors may thus be represented in a more efficient way, by taking advantage of the inherent statistical properties of them.

There exist several applicable vector quantization algorithms, including Lloyd's algorithm, K-means clustering, Neural network-based approaches, Hierarchical vector quantization and Predictive vector quantization. Vector quantization involves dividing the data into smaller pieces, called vectors, and then representing each vector by a single symbol, called a code vector. The goal of vector quantization is to find a set of code vectors that can be used to accurately represent the data with a minimal number of bits. This way, each vector in the data can be represented by a single symbol, which reduces the overall size of the data.

In examples, second data may be determined based at least in part on the difference dataset. For example, the difference dataset may be encoded/compressed using a discrete cosine transform (DCT) and/or entropy coding. The DCT decomposes a signal into a set of frequency components, with each component representing a particular frequency range in the signal. These frequency components are called cosine coefficients, and they can be used to represent the signal in a more compact form. This way, the DCT allows the signal to be represented with a smaller number of bits, which can be useful for data compression and transmission. It exists several different algorithms for computing the DCT, including the fast Fourier transform (FFT), the fast cosine transform (FCT), and the split-radix FFT.

In some embodiments, encoding/compression of the difference dataset may be determined considering which patches that were selected to be encoding into encoding vectors. For example, the corresponding parts of the difference dataset may be encoded lossless, while other parts of the difference data set may be encoded lossy or masked.

Advantageously, the encoding techniques described herein may be used for adaptive encoding where some parts of the input data are encoded lossless, and some parts are encoded lossy.

The first and second data may be transmitted for the input data to be reconstructed. For example, the first and second data may be transmitted to an external unit. The techniques described herein allows smaller storage and bandwidth utilization. This may be important in many contexts, for example in the context of AVs, when considering that extremely much sensor data, captured by dozens of sensors, may be collected, stored, and transmitted for later analysis, mining, training of algorithms, or for legal purposes. The techniques described herein allow for efficient communication and transmission of sensor data between sensors, processors, and transmission to remote operators for tele-operation of an AV.

In examples, a portion of the first data may be determined based at least in part by tokenizing each label of the set of labels, each label associated with an encoding vector encoded from a patch from the set of patches and indicating data content of said patch. This may aid reconstruction of the input data on a decoder (receiver) side. In examples, also labels for patches (portions of the input data) that are masked in the difference dataset, or not encoded into an encoding vector may be tokenized and transmitted as part of the first or second data, to improve reconstruction fidelity since the decoding can be conditioned to decode input data which can be characterized by the relevant label(s).

In examples, an available bandwidth for transmitting the first data and the second data may be determined. Based at least in part on the available bandwidth, on or more of the following may be performed:
  selecting the subset of patches based at least in part on the available bandwidth, such that a smaller number of patches are selected if the available bandwidth is lower compared to if the available bandwidth is higher.
  determining the one or more patches to be masked based at least in part on the available bandwidth, such that a higher number of patches may be masked if the available bandwidth is lower compared to if the available bandwidth is higher.
  setting a compression ratio for encoding of the difference dataset into the second data based at least in part on the available bandwidth, such that a higher compression rate is set if the available bandwidth is lower compared to if the available bandwidth is higher.

In this approach the bit rate/distortion tradeoffs of coding technique may be controlled by controlling the number of data patches that are encoded into encoding vectors, controlling the number of data patches that are masked and/or controlling the level of data compression used for encoding the difference dataset.

In examples, also the difference data set may be encoded similarly to the input data as described herein. For example, a second encoder ML model (e.g., a second transformer) may determine, based at least in part on the difference dataset, a second set of encoding vectors comprising one or more encoding vectors. For example, the difference dataset (e.g., in the form of a difference image) may be divided into a set of patches, where at least some of the patches may be selected and encoded into a set of encoding vectors, similar to what was described for the input data above. A second decoder ML model may determine, based at least in part on the second set of encoding vectors, a second reconstructed data, and a second difference data set may then be determined based at least in part on a comparison between the second reconstructed data (dataset) and the difference dataset. A first portion of the second data may be determined based at least in part on the second set of embedding vectors, and a second portion of the second data may be determined based at least in part on the second difference dataset. Such iterative approach of encoding the difference dataset(s) may be continued until a required compression rate is achieved.

Using the second set of encoding vectors, a reconstructed data (dataset) may be determined by a second decoder ML model. The second encoder and decoder ML model may be an encoder-decoder pair of a transformer type neural network architecture trained on reconstructing difference data from a set of encoding vectors, e.g., using historical data gathered by a sensor of an AV.

In examples, the techniques described herein may be employed for video coding. For example, a video stream may be received (e.g., from a camera of the AV), wherein the video stream comprises a first frame being the input data. A second frame in the video-stream may be encoded as an inter-frame, wherein a reference frame to the inter-frame encoded second frame being based at least in part on the first frame. In examples, the reference frame for computing the motion vectors and residual image for an inter frame, may either be a) the original input image or b) alternatively the reconstructed input image on the sender side (e.g., AV) to which a decoded version of the second data (i.e., a decoded difference dataset) is added. Third data may be determined based at least in part on the inter-frame and transmitted as described above.

In some examples, the residual image is encoded similarly to the input image as described herein. In these examples, the residual image of the inter-frame may be divided into a third set of patches, and a third subset of patches may be selected from the third set of patches. A third set of encoding vectors may be determined by encoding each patch of the third subset of patches into an encoding vector using an encoder from a third ML encoder (e.g., from a third encoder-decoder pair of a transformer type neural network architecture). A third reconstructed image may be determined by decoding the third set of embedding vectors using e.g., the decoder from the third encoder-decoder pair. A third difference dataset may be determined based at least in part on subtracting the third reconstructed image from the residual image. A first portion of the third data may be determined based at least in part on the third set of embedding vectors. A second portion of the third data may be determined based at least in part on the third difference dataset. A third portion of the third data may be determined based at least in part on the motion vectors of the inter-frame.

The techniques described herein can be implemented in a number of ways to efficiently and in a flexible way encode an image or video stream including the image. Examples are provided below with reference to FIGS. 1-6. Examples are discussed in the context of autonomous vehicles (AV); however, the methods, apparatuses, and components described herein can be applied to a variety of components (e.g., components comprising or controlling surveillance cameras, body camera of law enforcement, traffic cameras, etc.), and are not limited to autonomous vehicles. In one example, the techniques described herein may be utilized in driver-controlled vehicles. Moreover, examples are discussed in the context of the input data being an input image; however, the methods, apparatuses, and components described herein can be applied to a variety data such as point cloud data or audio data. Furthermore, the techniques described herein can be used with real data (e.g., captured using cameras), simulated data (e.g., generated by a simulator), or any combination of the two.

FIG. 1 illustrates an example scenario 100 including a vehicle 102. The vehicle 102 may be an autonomous vehicle (AV). The vehicle 102 will hereinafter be referred to as the AV to separate the vehicle 102 from another vehicle 116 present in the scenario 100. The AV 102 may include a vehicle computing device and may be part of a vehicle system (not shown) that includes one or more remote computing devices. The example scenario 100 involves the AV 102 using a camera 106—positioned on a front side of the AV and facing a forward direction of travel. The camera has a field of view (FOV) indicated by the dashed lines 104. The camera 106 may thus capture an image 124 of the environment in which the AV 102 travels. The environment in this scenario 100 comprises a T-junction comprising a first road 122 and a second road 120. The junction is controlled by a traffic light comprising two traffic light heads 112a-b. A pedestrian 110 walks besides the first road 122. The scenario 100 further comprises a building 114 and a tree 118. The AV may comprise further sensors 108a-c, as will further be exemplified below in conjunction with FIG. 6. In FIG. 1, the positions of the camera 106 and the sensors 108a-c are by way of example. The camera 106 may generally capture images in a main driving direction of the AV 102 but may be located at any suitable position on the AV 102. The sensor(s) 108a-c for sensing the environment and/or the vehicle operation status may similarly be positioned at any suitable place or places on the AV, as will be further described below in conjunction with FIG. 6.

Images obtained from the camera 106 may be used, at least in part, to control the AV 102. For example, the images may be used to determine whether the AV 102 should stop at the junction or can proceed to travel through the junction. The analysis of images captured by the camera 106, as well as analysis of other sensor data captured by the further sensors 108a-c, may be performed by the vehicle computing device. However, for various reasons, images 124 captured by the camera 106 may need to be transmitted from the AV to e.g., be stored at external memory, analyzed by remote computing devices or used for remote operation of the vehicle.

Images 124 captured by the camera 102 may contain different objects and regions that are either less important for perception tasks needed for autonomous navigation, or for any other reason as to why the images are transmitted from the AV such as legal reasons, data mining, teleoperation, etc. Such regions may comprise e.g., parts of the image corresponding to buildings details 114, sky, billboards contents, etc., or regions for which less textural information is needed, e.g., trees 118, vegetation, etc. Moreover, as described above, available bandwidth at a moving object, such as an AV, can be influenced by a number of factors and vary substantially from time to time.

For these reasons, an efficient and flexible codec for encoding the images 124 may be needed, to allow for varying transmission bandwidth, varying transmission quality of service, and images (or parts of images) of varying importance to be transmitted.

In the scenario 100 of FIG. 1, the image 124 is divided into a set of patches 126, 128, 130. Generally, some patches 126 (marked with a bold frame in FIG. 1) may contain image data that is considered important, e.g., in the context that the image content of a patch is important for controlling an AV 102. In the example of FIG. 1, these patches 126 include image data corresponding to e.g., other vehicles 116, pedestrians 110, traffic lights 112a-b, and parts of the roads 120, 122 relevant for a planned path of the AV 102. Some patches 128 (marked with a dashed rectangle with shorter dashes) may contain image data that is not considered relevant or important. In the example of FIG. 1, these patches 128 include image data corresponding to the sky, buildings 114, and vegetation 118. Some patches 130 (marked with a dashed rectangle with longer dashes) may contain image data with an importance somewhere between the importance of patches 126 and patches 128. In the example of FIG. 1, these patches 130 include image data corresponding to the parts of the roads 120, 122 not directly relevant for a planned path of the AV. It should be noted that the division of the image 124 into these categories of importance is just by way of example and that other contexts and applications for the techniques described herein may result in other ways of dividing the image 124. The patches may have the same size, such as 8*8 pixels, 16*16 pixels, etc., or may have different sizes. Moreover, in some examples, the image 124 may be divided based on semantic segmentation of the image, into portions not being uniformly sized.

In some embodiments, the determination of an "importance" of different part of the image content of the image 124 may be aided by classification algorithms which may analyze the image, possibly in conjunction with sensor data from other sensors 108*a-c* as well as map data for the environment which the AV traverses. Such classification and analysis may already be provided in an AV and used for autonomous navigation tasks. The encoding process described herein may take advantage of such ongoing classification and analysis of sensor data and use already provided labels of objects and areas of images captured by the camera 106 for determining an importance level of different part of the image content of the image 124. For example, some of the patches 126, 128, 130 may be associated with one or more labels which can be used to determine the importance of the image content of a patch. An importance level may be determined using e.g., heuristics or ML models, possibly in combination.

Some examples involve applying an image segmentation algorithm to the input image to detect a set of features in the image and classifying at least some features of the detected set of features. The image segmentation algorithm and/or the classification algorithm may be specifically designed for the purpose of providing an efficient and flexible encoding as described herein. Based on the classified features, the importance level of a patch or a portion of the image 124 may be determined and used in the encoding process as described herein.

The image 124 may thus be divided into a set of patches. From these patches, a subset of patches may be selected and used to encode the image 124. For example, the patches 126 determined to be important (for the applicable context) may be selected and input into an encoder ML model 134. The encoder 134 may determine a set of encoding vectors 136 from the subset of patches. Some of the patches 128 may be considered not important, and the image content of these patches may not form part of the encoding process, and thus metaphorically being thrown away 132.

Figure 2:
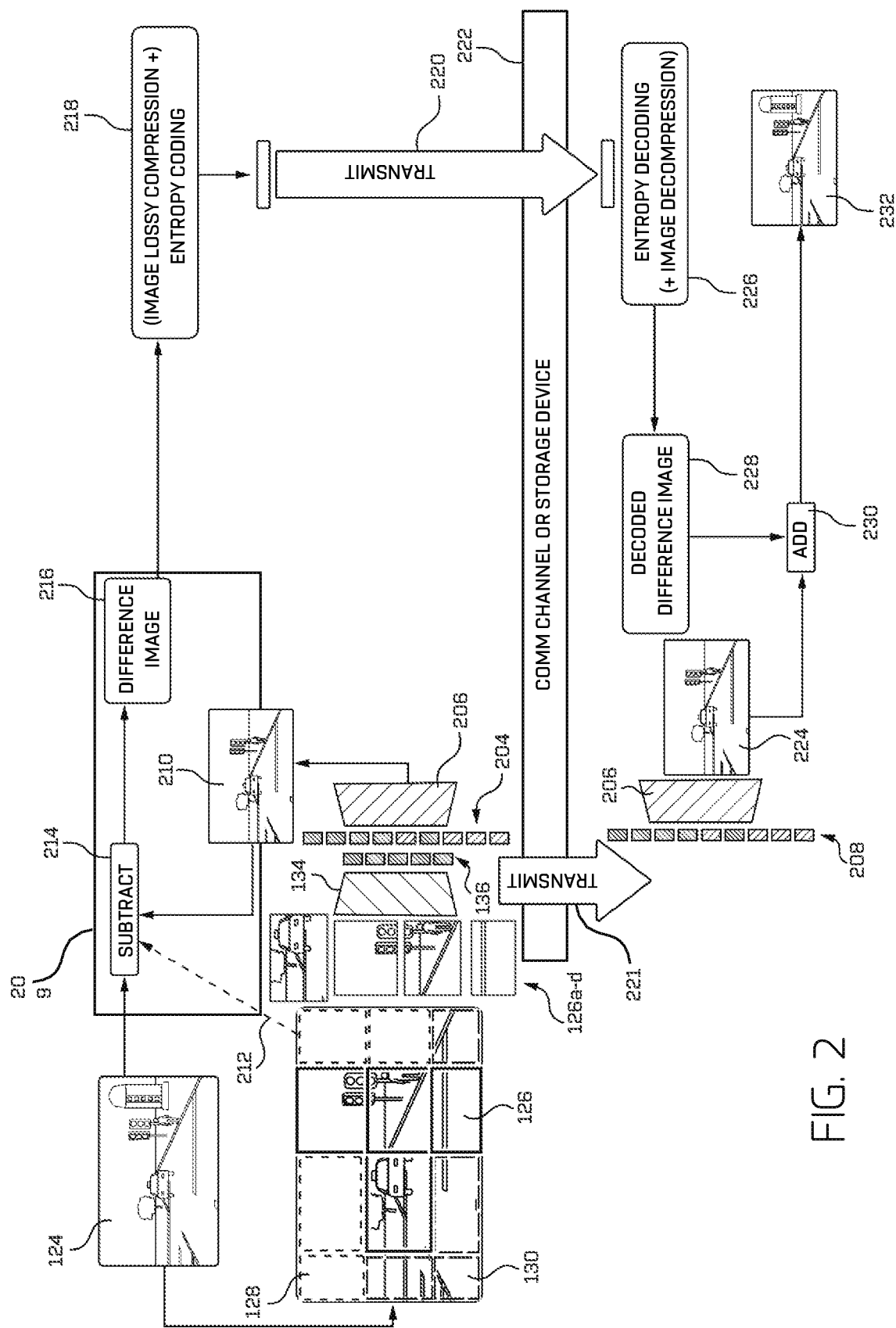
FIG. 2 depicts an example scenario of encoding and decoding an image.

FIG. 2 depicts an example scenario of encoding and decoding an image 124 captured in the scenario of FIG. 1. As described in conjunction with FIG. 1, the image 124 has been divided into a plurality of patches, and an importance level have been determined for each patch. The patches 126*a-d* (a subset of the patches of image 124) determined as important are selected and the encoder machine-learned (ML) model 134 determines a set of encoding vectors 136 associated with the subset of patches 126*a-d*.

To mitigate an imperfect reconstruction on the receiver side (lower part of FIG. 2), a difference dataset (or difference image) 216 is determined at differential encoding layer 209 of at the decoder side. This is achieved by determining, by a decoder ML model 206 (which advantageously is the same decoder ML model used on the receiver side) and based at least in part on the set of encoding vectors 136, a reconstructed image 210. An input 204 to the decoder 206 may comprise the encoding vectors 136 as well as other data which aids reconstruction. Such other data may comprise for example labels of (some or all) patches of the input image 124, map data relating to the environment in which the input image 124 is captured, other sensor data captured in that environment, etc. The other data may also comprise location placeholders to inform the decoder the location in the data for which no encoding vectors have been retrained. The encoder-decoder pair 134, 206 has been trained to encode and reconstruct images based on these types of data, for example using historical data captured by an AV.

The reconstructed image 210 may thus miss some of the details in the input image 124. For example, in the example of FIG. 2, the building to the right in the image 124 is missing in the reconstructed image 210. It should be noted that in some embodiments, additional data such as labels of masked patches 128 of the input image 124 or map data may aid the decoder 206 to add back (parts of) the patches not encoded into encoding vectors when decoding the encoding vectors 136 into a reconstructed image 210.

The difference dataset 216 is determined by comparing the reconstructed image 210 with the input image 124. In the example of FIG. 2, the difference dataset 216 is a difference image determined by subtracting 214 the reconstructed image 210 from the input image 124, for example by looping through all the pixels in the images and subtract the pixel values from the reconstruction image 210 from the pixel value of the input image.

To further reduce the bitrate when encoding the difference dataset, in some examples the difference dataset contains masked portions, for example a subset of the difference dataset being an empty set, a subset of the difference dataset with predefined data, a subset of the difference dataset comprising data corresponding to a blurred version of image data of the one or more patches to be masked. The masked portions are determined, at the differential encoding layer 209, at least in part based on 212 portions 128 of the input image 124 that for some reason is not considered important for reconstruction at the decoder side. This decision may for example be made by determining, for a patch 128 from the set of patches 126, 128, 130, based at least in part on a label associated with the patch, a level of importance of image content of said patch, the level of importance indicating an importance of the image content of said patch for controlling an autonomous vehicle.

The difference dataset 216 may then be compressed and encoded 218 into second data as described above to reduce the size of the dataset before transmission 220. The encoding vectors 134 may be further compressed into first data to reduce the size before transmission 221. The transmission 221 of the first data may in some embodiments (not shown in FIG. 2) comprise a separate transmission for the encoding vectors (or data determined based on the encoding vectors) and a separate transmission of side information to aid decoding, such as labels of (some or all) patches of the input image 124, map data relating to the environment in which the input image 124 is captured, other sensor data captured in that environment, etc. The side information may also comprise location placeholders to inform the decoder side the locations in the data for which no encoding vectors have been retrained. In some embodiments, the transmission 220, 221 of the first and second data may refer to, or include storage of the first and second data in a storage on the AV or external to the AV.

Advantageously, by encoding the input image 124 into two different data, a flexible and adaptable encoding method is achieved. Moreover, also the transmission method or strategy 221, 222 may in some examples be different for the first and second data, for example when it comes error correction strategies. Error correction codes (ECC) can be very effective at detecting and correcting errors, but they may have some limitations. For example, they may not be able to correct all errors, or they may add so much redundancy to the message that they significantly increase the amount of data that needs to be transmitted. As a result, it may be important to consider which error correction code to use in a given situation, based on the specific requirements of the application.

In some examples, the first data (corresponding to the encoding vectors 134) may be less sensitive to loss of data in the transmission, since the decoder 206 at the decoder side may be trained to reconstruct an image from encoding vectors from only a subset of image patches of the original input image 124. Consequently, losing some data during transmission 221 of the first data may be handled by the decoder side without a substantial reduction of the quality of the reconstructed image 224. In some examples, transmission 221 of the first data may comprise including ECC allowing for a first fraction of errors or of missing bits being corrected by a receiver. Transmission 220 of the second data may comprise including ECC allowing for a second fraction of errors of missing bits being corrected by a receiver. In some examples, the second fraction exceeds the first fraction.

Available bandwidth for the transmission 220, 221 of the first and second data may influence encoding of the difference dataset 216 and/or the encoding of the encoding vectors 136 into the first and second data respectively. For example, the compression ratio for encoding of the difference dataset 216 into the second data may be set based at least in part on the available bandwidth. In some examples, the compression ratio for encoding of the encoding vectors 136 into the first data may be set based at least in part on the available bandwidth, for example by choosing lossy compression strategies such as vector quantization in case bandwidth is limited and choosing lossless compression strategies such as entropy coding in case bandwidth is less limited.

As mentioned above, in some examples, the encoder-decoder pair 134, 206 may be trained to condition encoding/decoding on labels associated with the patches 126, 128, 130 and/or the encoding vectors 136. For example, the labels for patches that are masked 130 or not encoded into encoding vectors (e.g., image patches 128), may be used to condition the decoder 206 when decoding the corresponding image patches in the reconstructed image 210, to improve reconstruction fidelity. These types of task-based encoding/decoding can also be optionally omitted to avoid incurring too much computational complexity, therefore trading off latency in the encoder side with increased bit rate characteristics.

In some examples, several image with overlapping image content may be captured, e.g., using a plurality of cameras with overlapping field of view. In these examples, selection of image patches to be encoded/masked etc., may further be based at least in part on any overlapping areas between the plurality of captured images. For example, an image patch of a second image capturing a portion of a scene which is also captured by a first image may be masked in the second or the first image. In some examples, all image patches in a second image which correspond to areas of the scene which is also captured in a first image is masked out when encoding either the first or the second image. This may further reduce both bit rate when transmitting the encoded first and second image as well as storage requirements when storing the encoded first and second image.

At the decoder side, a set of embedding vectors (as well as any other data such as labels transmitted in the first data) 206 is determined from the received first data. A reconstructed image 224 is determined by a decoder ML model 206 using the data received over the communication channel 222 (or extracted from a storage medium if applicable). Moreover, a difference dataset (e.g., a difference image) is determined by decoding and decompressing 226, 228 second data received over the communication channel (or extracted from a storage medium if applicable). The decoded difference image is added to the reconstructed image 224 to form a fully reconstructed image 232. As described above, the decoder side may in some embodiments correspond to a tele-operator service used to remotely control an AV from which the first and second data is received. In this example, the fully reconstructed image 232 may be used for remote operation of the AV, for example by transmitting control commands to the AV.

In some embodiments, at the decoder side, a video stream may be decoded corresponding to the encoding strategy described above, by e.g., receiving third data, decoding the third data into an inter-frame and for example determine a second fully reconstructed image by combining the inter frame with the first fully reconstructed image 232 (being the key frame in this example).

Figure 3:
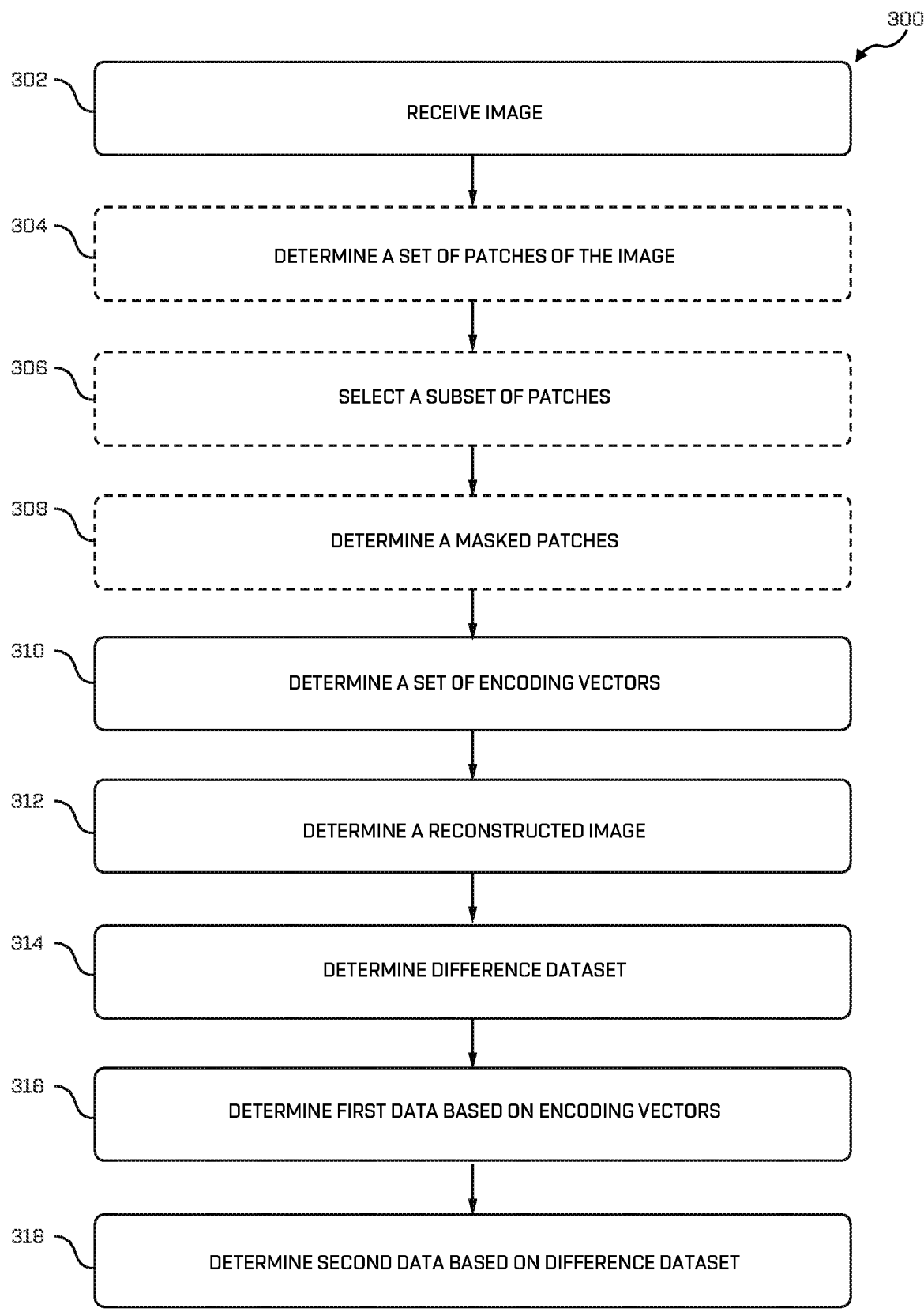
FIG. 3 depicts a flow chart of an example encoding process.

FIG. 3 depicts a flow chart of an example encoding process 300 of an input image. The process 300 comprises receiving 302 the input image, for example from a camera of an AV. The process may comprise determining 304, based at least in part on the input image, a set of patches of the input image. The process may comprise determining 306, based at least in part on the set of patches, a subset of patches from the set of patches. The process may comprises determining 308 one or more patches to be masked from the set of patches. The determining step 306 and 308 may be based on available bandwidth and/or labels of the patches of the input image such that a tradeoff (balance) between bit rate and distortion may be controlled in an efficient and flexible way.

The process 300 comprises determining 310 by an encoder machine-learned (ML) model and based at least in part on an input image (for example based at least in part t on the subset of patches determined in step 306) a set of encoding vectors. The process 300 comprises determining 312, by a decoder ML model and based at least in part on the set of encoding vectors, a reconstructed image. To mitigate an imperfect reconstruction using only the encoding vectors, a difference dataset is determined 314, based at least in part on a comparison of the reconstructed image with the input image. The process further comprises determining 316 first data based at least in part on the set of encoding vectors and determining 318 second data based at least in part on the difference dataset. By dividing the encoded version of the input image into two separate data, flexibility of both transmission and compression of the two separate data may be achieved.

Figure 4:
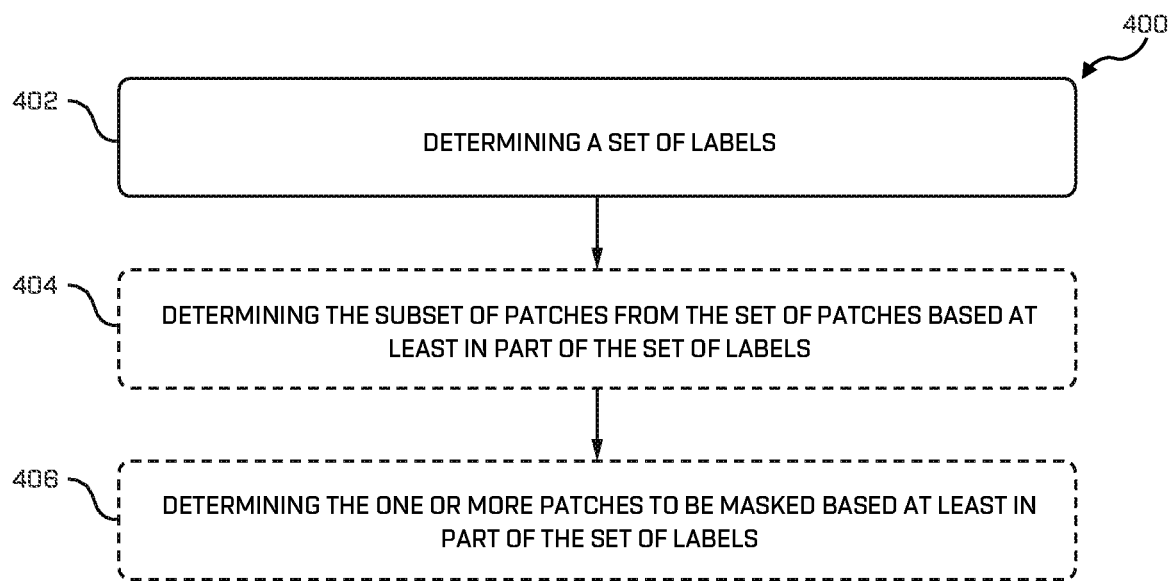
FIG. 4 depicts a flow chart of an example encoding process

FIG. 4 depicts a flow chart of an example encoding process 400 of an input image. The encoding process 400 may for example be used in the process of FIG. 3, when determining 306 a subset of patches from the set of patches and/or when determining 308 one or more patches to be masked from the set of patches. The process 400 of FIG. 4 comprises determining 402 a set of labels, each label associated with a patch from the set of patches of the input image (e.g., as received 302 in the process 300 of FIG. 3). Each label indicates image content of an associated image patch. The process 400 may further comprise determining 404 the subset of patches from the set of patches based at least in part of the set of labels. The process 400 may further comprise determining 406 the one or more patches to be masked based at least in part of the set of labels.

Figure 5:
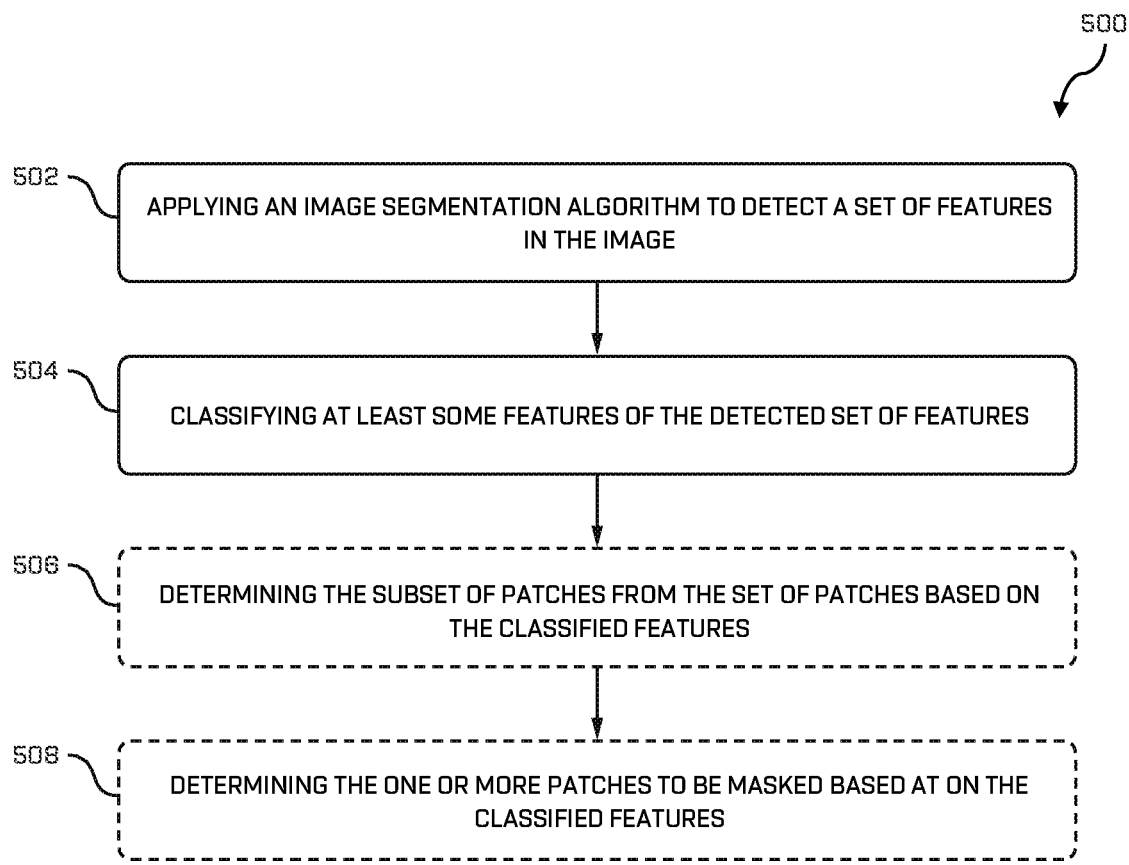
FIG. 5 depicts a flow chart of an example encoding process

FIG. 5 depicts a flow chart of an example encoding process 500 of an input image. The encoding process 500 may for example be used in the process of FIG. 3, when determining 306 a subset of patches from the set of patches and/or when determining 308 one or more patches to be masked from the set of patches. The process 500 of FIG. 5 comprises applying 502 an image segmentation algorithm to the input image (e.g., as received 302 in the process 300 of FIG. 3) to detect a set of features in the image. The process 500 further comprises classifying 504 at least some features of the detected set of features. The process 500 may further comprise determining 506 the subset of patches from the set of patches based at least in part on the classified features. The process 500 may further comprise determining 508 the one or more patches to be masked based at least in part of the classified features.

Additional Example Vehicle System

Figure 6:
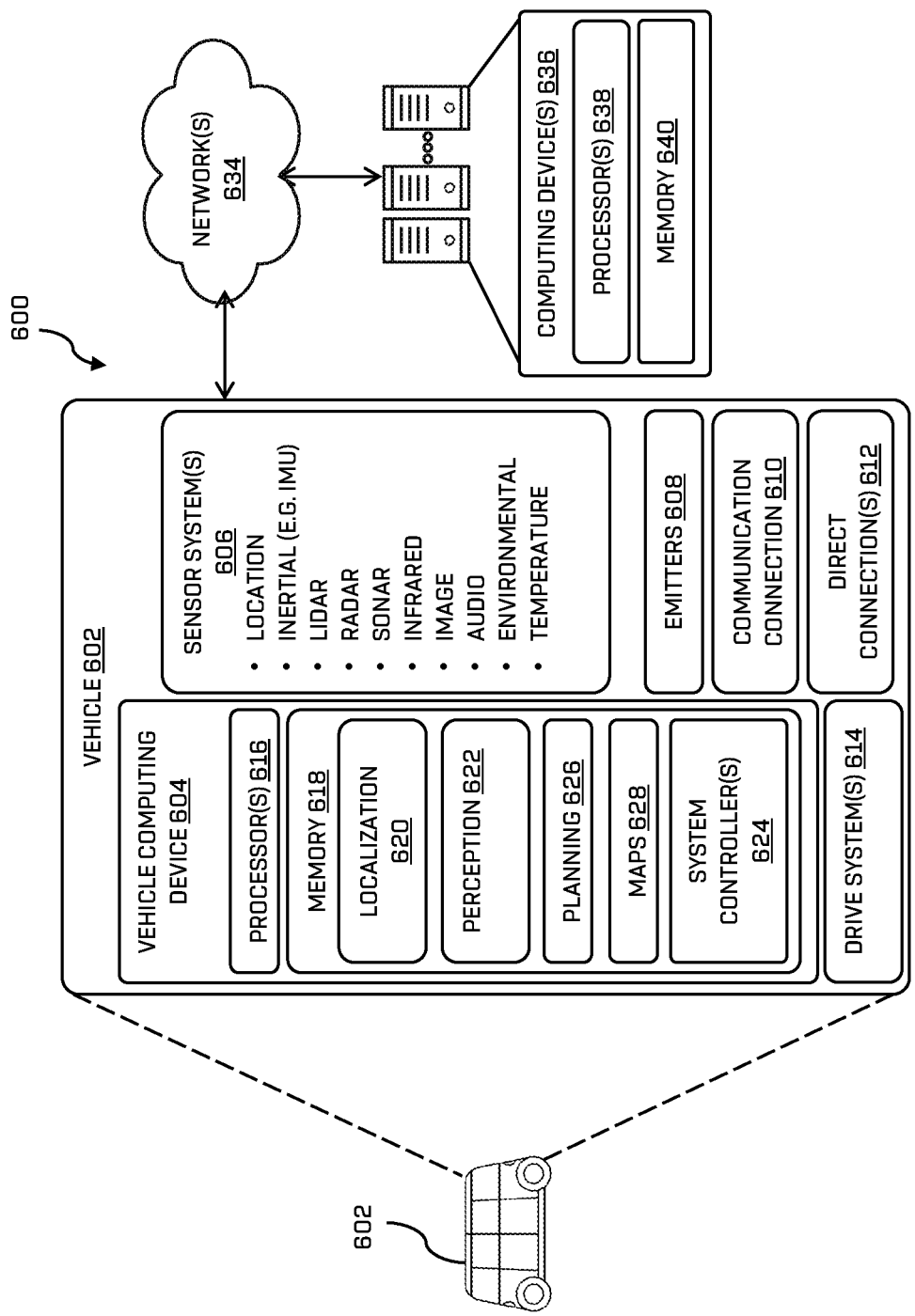
FIG. 6 depicts a block diagram of an example vehicle system.

A further example of a vehicle system 600 is depicted in FIG. 6. The vehicle system 600 includes a vehicle 602, which may be the vehicles 102 in FIG. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 602 may be a fully or partially autonomous vehicle having any other level or classification. Moreover, in some instances, the techniques described herein may be usable in conjunction with non-autonomous vehicles as well.

The vehicle 602 may include vehicle computing device(s) 604, one or more sensor systems 606, one or more communication connections 610, at least one direct connection 612 (e.g., for physically coupling the vehicle 602 to exchange data and/or to provide power), and one or more drive systems 614.

In some instances, the sensor(s) 606 (referred to as 106, 108*a-c*) may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), one or more cameras (such as camera 106 in FIG. 1, e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 606 may include multiple instances of each of these or other types of sensors. For instance, the LIDAR sensors may include individual LIDAR sensors located at the corners, front, back, sides, and/or top of the vehicle 602. As another example, the cameras may include multiple cameras disposed at various locations about the exterior and/or interior of the vehicle 602. The cameras may in some instances have overlapping FOVs. The sensor(s) 606 may provide input to the vehicle computing device(s) 604 such as relating to a yaw rate of a vehicle, a linear velocity of the vehicle, a lateral velocity of the vehicle, and commanded wheel angles of the wheels such that the vehicle computing device(s) 604 (or a remote computing device 636) may determine the scaling and bias coefficients as discloses herein.

The vehicle computing device(s) 604 may include one or more processors 616 and memory 618 communicatively coupled with the one or more processors 616. In the illustrated example, the memory 618 of the vehicle computing device(s) 604 stores a localization component 620, a perception component 622, a planning component 626, one or more maps 628, one or more system controllers 624, and a safety system 630. Though depicted in FIG. 6 as residing in memory 620 for illustrative purposes, it is contemplated that the localization component 620, perception component 622, planning component 626, safety system 630 and/or the one or more maps 628 may be accessible to the vehicle 602 (e.g., stored on, or otherwise accessible by, memory remote from the vehicle 602). The memory 620 may further store data set(s) comprising the estimated lateral acceleration, the estimated turn angle, the commanded crab angle and the lateral velocity, wherein data set(s) is/are used to perform the optimization to determine the scaling and bias coefficients as discussed herein. Such data set, or part of said data set, may also be accessible to the vehicle 602 (e.g., stored on, or otherwise accessible by, memory remote from the vehicle 602).

An example of this remote memory is the computing device 636. The computing device 636 may include one or more processors 638 and memory 640. Although not depicted here, in some instances the computing device 636 may store the above-referenced components and controllers. The processor 616 may access these as required from the computing device 636 via the network 614 that connects the vehicle 602 and the computing device 636.

In some examples, the vehicle 602 may send operational data, including raw or processed sensor data from the sensor system(s) 606, to one or more computing device(s) 616 via the network(s) 614.

In some instances, the perception component 622 may include functionality to perform object detection, segmentation, and/or classification. For example, the perception component may determine labels associated to sensor data captured by a sensor of the AV, such as an image captured by a camera of the AV. In some instances, the labels are associated with a position in the sensor data. Labels may include e.g., pedestrian, vehicle, bicycle, animal, building, trees, traffic sign, road, grass, sky, road markings, etc. In some examples, the perception component 622 may provide processed sensor data that indicates a presence of an entity that is proximate to the vehicle 602 and/or a classification of the entity as an entity type (e.g., car, pedestrian, cyclist, animal, traffic light, building, tree, road surface, curb, sidewalk, unknown, etc.). In additional or alternative examples, the perception component 622 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 602 may provide the data relating to the objects in the environment as inputs to a perception component of the vehicle computing device, such as perception component 622. The perception component may use the data to perform object detection, segmentation, classification, and other data processing to determine characteristics about the objects.

The perception component 622 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 626 or localization component such as localization component 620, or from a remote device, such as remote computing device 636. In some examples, the data may comprise map data received from the maps 628 or the other components in memory.

The data gathered (such as for example the first and second data described above, e.g., in conjunction with FIG. 2) may be communicated from a starting, first component, e.g., the processors of the vehicle, to a target, second component, such as a different device, different hardware, or different software. The term component is here used to refer to devices, hardware, software, or other features of a computing system to which data may be transferred, and is distinct from the use of component in relation to the software components of the vehicle such as the perception, localization, or planning components. It will be apparent from the context in which the term component is used which of these is being referred to. In some examples, the data may be transferred between two software applications. The software applications may operate within the vehicle computing device and be stored in memory of the vehicle computing device, or may be in remote computing devices. For example, referring to FIG. 6, the data may be transferred from the perception component 622 to other software components stored in the memory 618 of the vehicle, such as the localization component 620 or planning component 626. In some instances, the data may be transferred from the perception component 622 to the remote computing device 636 via the communication connection 610 and network 634.

The localization component 620 may be configured to receive data from the sensor system(s) 606 to determine a position and/or orientation of the vehicle 602, e.g., one or more of an x-, y-, z-position, roll (such as used for determining a gravitational acceleration in Equation 30), pitch, or yaw. For example, the localization component 620 may include and/or request/receive a map 628 of an environment and may continuously determine a location and/or orientation of the autonomous vehicle within the map 628. For example, the localization component 620 may determine the lateral velocity of the vehicle 602 as described herein.

In at least one example, the planning component 626 may determine a location of a user based on image data of an environment received from the user using, for example, bags of binary words with image-based features, artificial neural network, and the like. Further, the planning component 626 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 602 may stop to pick up a passenger. In at least one example, the planning component 626 may determine a pickup location based at least in part on determining a user identity (e.g., determined via image recognition or received as an indication from a user device, as discussed herein).

A communication connection 610 may enable communication between the vehicle 602 and one or more other local or remote computing device(s). For instance, the communication connection(s) 610 (such as for example communication channel 222 of FIG. 2) may facilitate communication with other local computing device(s) on the vehicle 602 and/or the drive system(s) 614. Also, the communication connection(s) 608 may additionally or alternatively allow the vehicle 602 to communicate with other nearby computing device(s) (e.g., other nearby vehicles, traffic signals, etc.). The communication connection(s) 610 may additionally or alternatively enable the vehicle 602 to communicate with a computing device 636. The computing device 636 may be at a remote location from the vehicle and the vehicle may communication with the computing device 636 over a network 614.

It will be appreciated that encoding data relating to the encoding of an input image (or video stream comprising the input image) is used as examples in FIGS. 1-5, but that any data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 602, map data may be transferred from the one or more maps 628 of the vehicle memory 618 to the localization or planning components 620, 626. In some examples, data may be transferred from the planning component 626 to the system controller 624 and/or one or more emitters 608. In some examples, data may be transferred from the system controller 624 to one or more drive systems 614.

The maps 628 may be used by the vehicle 602 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed. As discussed herein, the maps 628 may further indicate the known locations of traffic lights and may be used by the perception 622 to identify known traffic lights in measurements captured by the sensor system(s) 606.

The system controller 624 may be configured to control steering, propulsion, braking, safety, emitters, communication, and other systems of the vehicle 602. The system controller(s) 624 may communicate with and/or control corresponding systems of the drive system(s) 614 and/or other components of the vehicle 602. The system controller(s) 624 may be communicatively coupled to one or more sensors of the vehicle sensor system(s) 606.

Emitter(s) 608 may be provided for emitting light and/or sound, and may include interior emitters to communicate with passengers of the vehicle 602 and/or exterior emitter(s) to communicate with pedestrians or other nearby vehicles.

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 620, 640 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

EXAMPLE CLAUSES

A: A system comprising one or more processors; and one or more non-transitory computer-readable media storing computer executable instructions that, when executed by the one or more processors, cause the system to perform actions comprising: receiving, from a camera of a vehicle, an input image; determining, based at least in part on the input image, a set of patches of the input image; determining, based at least in part on the set of patches, a subset of patches from the set of patches; determining, by an encoder machine-learned (ML) model and based at least in part on the subset of patches, a set of encoding vectors associated with the subset of patches; determining, by a decoder ML model and based at least in part on the set of encoding vectors, a reconstructed image; comparing the reconstructed image with the input image; determining, based at least in part on the comparing, a difference dataset between the reconstructed image and the input image; determining first data based at least in part on the set of encoding vectors; determining second data based at least in part on the difference dataset; and transmitting the first data and the second data for the input image to be reconstructed.

B: The system according to clause A, wherein the instructions further cause the system to perform actions comprising: determining one or more patches to be masked from the set of patches, wherein the difference dataset contains masked portions based at least in part on the determined one or more patches to be masked, wherein a masked portion refers to one of: a subset of the difference dataset being an empty set, a subset of the difference dataset with predefined data, a subset of the difference dataset comprising data corresponding to a lossy version of image data of the one or more patches to be masked.

C: The system according to any one of clauses A-B, wherein the instructions further cause the system to perform actions comprising: applying an image segmentation algorithm to the input image to detect a set of features in the image; classifying at least some features of the detected set of features; and at least one of: determining the subset of patches from the set of patches based at least in part of the classified features, or determining the one or more patches to be masked based at least in part of the classified features.

D: The system according to any one of clauses A-C, wherein the instructions further cause the system to perform actions comprising: determining a set of labels, each label associated with a patch from the set of patches and indicating image content of said patch; and at least one of: determining the subset of patches from the set of patches based at least in part of the set of labels, or determining the one or more patches to be masked based at least in part of the set of labels.

E: The system according to clause D, wherein the instructions further cause the system to perform actions comprising: determining, for a patch from the set of patches, based at least in part on a label associated with the patch, a level of importance of image content of said patch, the level of importance indicating an importance of the image content of said patch for controlling an autonomous vehicle, wherein the level of importance is determined by: inputting one or more labels associated with the patch into a detection model configured to classify a level of importance based at least in part on one or more labels, wherein the detection model is one of: a ML model and a heuristics engine; and at least one of: upon the level of importance not meeting a first threshold, determining that said patch is a patch to be masked, or upon the level of importance meeting or exceeding a second threshold, including the patch in the subset of patches.

F: A computer-implemented method comprising: determining, by an encoder machine-learned (ML) model and based at least in part on input data, a set of encoding vectors comprising one or more encoding vectors; determining, by a decoder ML model and based at least in part on the set of encoding vectors, reconstructed data; comparing the reconstructed data with the input data; determining, based at least in part on the comparing, a difference dataset between the reconstructed data and the input data; determining first data based at least in part on the set of encoding vectors; determining second data based at least in part on the difference dataset. And transmitting the first data and the second data.

G: The computer-implemented method according to clause F, further comprising receiving sensor data captured by at least one sensor of an autonomous vehicle; and determining the input data based at least in part on the sensor data.

H: The computer-implemented method according to any one of clause F-G, wherein the input data comprises an image.

I: The computer-implemented method according to any one of clause F-H, further comprising: determining, based at least in part on the input data, a set of patches of the input data; determining, based at least in part on the set of patches, a subset of patches from the set of patches; and determining, by the encoder ML model and based at least in part on the subset of patches, the set of encoding vectors.

J: The computer-implemented method according to any one of clause F-I, further comprising: determining one or more patches to be masked from the set of patches, wherein the difference dataset contains masked portions based at least in part on the determined one or more patches to be masked, wherein a masked portion refers to one of: a subset of the difference dataset being an empty set, a subset of the difference dataset with predefined data, and a subset of the difference dataset comprising data corresponding to a lossy version of input data of the one or more patches to be masked.

K: The computer-implemented method according to any one of clause F-J, further comprising: determining a set of labels, each label associated with an encoding vector encoded from a patch from the set of patches and indicating data content of said patch; determining a portion of the first data based at least in part by tokenizing each label of the set of labels.

L: The computer-implemented method according to any one of clause F-K, further comprising: determining, by a second encoder ML model and based at least in part on the difference dataset, a second set of encoding vectors comprising one or more encoding vectors; determining, by a second decoder ML model and based at least in part on the second set of encoding vectors, a second reconstructed data; comparing the second reconstructed data with the difference dataset; determining, based at least in part on the comparing, a second difference dataset; determining a first portion of the second data based at least in part on the second set of embedding vectors; determining a second portion of the second data based at least in part on the second difference dataset.

M: The computer-implemented method according to any one of clause F-L, further comprising: receiving a video stream, wherein the video stream comprises a first frame being the input data; encoding a second frame in the video stream as an inter-frame, wherein a reference frame to the inter-frame encoded second frame being based at least in part on the first frame; determining third data based at least in part on the encoded inter-frame.

N: The computer-implemented method according to any one of clause F-M, further comprising: determining an available bandwidth for transmitting the first data and the second data; and at least one of: selecting the subset of patches based at least in part on the available bandwidth, determining the one or more patches to be masked based at least in part on the available bandwidth, and setting a compression ratio for encoding of the difference dataset into the second data based at least in part on the available bandwidth.

O: The computer-implemented method according to any one of clause F-N, further comprising: applying a data segmentation algorithm to the input data to detect a set of features in the data; classifying at least some features of the detected set of features; and at least one of: determining the subset of patches from the set of patches based at least in part on the classified features, or determining the one or more patches to be masked based at least in part on the classified features.

P: The computer-implemented method according to any one of clause F-O, further comprising: determining a set of labels, each label associated with a patch from the set of patches and indicating data content of said patch; and at least one of: determining the subset of patches from the set of patches based at least in part of the set of labels, or determining the one or more patches to be masked based at least in part of the set of labels.

Q: The computer-implemented method according to any one of clause F-P, further comprising: receiving further data from a sensor of an autonomous vehicle, and at least one of: determining the subset of patches from the set of patches based at least in part on the further data, and determining the one or more patches to be masked based at least in part on the further data.

R: One or more non-transitory computer-readable media storing instructions executable by one or more processors, wherein the instructions, when executed, cause the one or more processors to perform operations comprising: determining, by an encoder machine-learned (ML) model and based at least in part on input data, a set of encoding vectors comprising one or more encoding vectors; determining, by a decoder ML model and based at least in part on the set of encoding vectors, reconstructed data; comparing the reconstructed data with the input data; determining, based at least in part on the comparing, a difference dataset between the reconstructed data and the input data; determining first data based at least in part on the set of encoding vectors; determining second data based at least in part on the difference dataset;

S: The one or more non-transitory computer-readable media according to clause R, wherein the operations further comprise: receiving sensor data captured by at least one sensor of an autonomous vehicle; determining the input data based at least in part on the sensor data.

T: The one or more non-transitory computer-readable media according to any one of clause R-S, wherein the operations further comprise: determining, based at least in part on the input data, a set of patches of the input data; determining, based at least in part on the set of patches, a subset of patches from the set of patches; determining, by the encoder ML model and based at least in part on the subset of patches, the set of encoding vectors.

U: The one or more non-transitory computer-readable media according to any one of clause R-T, wherein the operations further comprise: determining one or more patches to be masked from the set of patches, wherein the difference dataset contains masked portions based at least in part on the determined one or more patches to be masked, wherein a masked portion refers to one of: a subset of the difference dataset being an empty set, a subset of the difference dataset with predefined data, and a subset of the difference dataset comprising data corresponding to a lossy version of input data of the one or more patches to be masked.

V: The one or more non-transitory computer-readable media according to any one of clause R-U, wherein the operations further comprise: determining a set of labels, each label associated with an encoding vector encoded from a patch from the set of patches and indicating data content of said patch; and determining a portion of the first data based at least in part by tokenizing each label of the set of labels.

X: The one or more non-transitory computer-readable media according to any one of clause R-V, wherein the operations further comprise: applying an image segmentation algorithm to the input image to detect a set of features in the image; classifying at least some features of the detected set of features; and at least one of: determining the subset of patches from the set of patches based at least in part of the classified features, or determining the one or more patches to be masked based at least in part of the classified features.

Y: The one or more non-transitory computer-readable media according to any one of clause R-X, wherein the operations further comprise: determining a set of labels, each label associated with a patch from the set of patches and indicating data content of said patch; and at least one of: determining the subset of patches from the set of patches based at least in part of the set of labels, and determining the one or more patches to be masked based at least in part of the set of labels.

While the example clauses described above are described with respect to one particular implementation, it should be understood that, in the context of this document, the content of the example clauses can also be implemented via a method, device, system, computer-readable medium, and/or another implementation. Additionally, any of examples A-Y may be implemented alone or in combination with any other one or more of the examples A-Y

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might." unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:
1. A system comprising:
one or more processors; and
one or more non-transitory computer-readable media storing computer executable instructions that, when executed by the one or more processors, cause the system to perform actions comprising:
receiving, from a camera of a vehicle, an input image;
determining, based at least in part on the input image, a set of patches of the input image;
determining, based at least in part on the set of patches, a subset of patches from the set of patches, the subset of patches determined based at least in part on a respective level of importance of the patches of the subset of patches to cause control of an autonomous vehicle;

determining, by an encoder machine-learned (ML) model and based at least in part on the subset of patches, a set of encoding vectors associated with the subset of patches;

determining, by a decoder ML model and based at least in part on the set of encoding vectors, a reconstructed image;

comparing the reconstructed image with the input image;

determining, based at least in part on the comparing, a difference dataset between the reconstructed image and the input image;

determining first data based at least in part on the set of encoding vectors;

determining second data based at least in part on the difference dataset; and transmitting the first data and the second data for the input image to be reconstructed.

2. The system of claim 1, wherein the instructions further cause the system to perform actions comprising:

determining one or more patches to be masked from the set of patches, wherein the difference dataset contains masked portions based at least in part on the determined one or more patches to be masked, wherein a masked portion refers to one of:
 a subset of the difference dataset being an empty set,
 a subset of the difference dataset with predefined data, or
 a subset of the difference dataset comprising data corresponding to a lossy version of image data of the one or more patches to be masked.

3. The system of claim 2, wherein the instructions further cause the system to perform actions comprising:

applying an image segmentation algorithm to the input image to detect a set of features in the image;

classifying at least some features of the detected set of features;

and at least one of:
 determining the subset of patches from the set of patches based at least in part of the classified features, or
 determining the one or more patches to be masked based at least in part of the classified features.

4. The system of claim 2, wherein the instructions further cause the system to perform actions comprising:

determining a set of labels, each label associated with a patch from the set of patches and indicating image content of said patch;

and at least one of:
 determining the subset of patches from the set of patches based at least in part of the set of labels, or
 determining the one or more patches to be masked based at least in part of the set of labels.

5. The system of claim 4, wherein the instructions further cause the system to perform actions comprising:

determining, for a patch from the set of patches, based at least in part on a label associated with the patch, a level of importance of image content of said patch, the level of importance indicating an importance of the image content of said patch for controlling an autonomous vehicle, wherein the level of importance is determined by:

inputting one or more labels associated with the patch into a detection model configured to classify a level of importance based at least in part on one or more labels, wherein the detection model is one of: a ML model and a heuristics engine;

and at least one of:
 upon the level of importance not meeting a first threshold, determining that said patch is a patch to be masked, or
 upon the level of importance meeting or exceeding a second threshold, including the patch in the subset of patches.

6. A method comprising:

determining, by an encoder machine-learned (ML) model and based at least in part on input data, a set of encoding vectors comprising one or more encoding vectors, the input data determined based at least in part on an importance of the input data to cause control of an autonomous vehicle;

determining, by a decoder ML model and based at least in part on the set of encoding vectors, reconstructed data;

comparing the reconstructed data with the input data;

determining, based at least in part on the comparing, a difference dataset between the reconstructed data and the input data;

determining first data based at least in part on the set of encoding vectors;

determining second data based at least in part on the difference dataset; and transmitting the first data and the second data.

7. The method of claim 6, further comprising:

receiving sensor data captured by at least one sensor of an autonomous vehicle; and determining the input data based at least in part on the sensor data.

8. The method of claim 6, further comprising:

determining, based at least in part on the input data, a set of patches of the input data;

determining, based at least in part on the set of patches, a subset of patches from the set of patches; and determining, by the encoder ML model and based at least in part on the subset of patches, the set of encoding vectors.

9. The method of claim 8, further comprising:

determining one or more patches to be masked from the set of patches, wherein the difference dataset contains masked portions based at least in part on the determined one or more patches to be masked, wherein a masked portion refers to one of:
 a subset of the difference dataset being an empty set,
 a subset of the difference dataset with predefined data, or
 a subset of the difference dataset comprising data corresponding to a lossy version of input data of the one or more patches to be masked.

10. The method of claim 8, further comprising:

determining a set of labels, each label associated with an encoding vector encoded from a patch from the set of patches and indicating data content of said patch; and determining a portion of the first data based at least in part by tokenizing each label of the set of labels.

11. The method of claim 6, further comprising:

receiving a video stream, wherein the video stream comprises a first frame being the input data;

encoding a second frame in the video stream as an inter-frame, wherein a reference frame to the inter-frame encoded second frame being based at least in part on the first frame; and determining third data based at least in part on the encoded inter-frame.

12. The method of claim 9, further comprising:
determining an available bandwidth for transmitting the first data and the second data;
and at least one of:
selecting the subset of patches based at least in part on the available bandwidth,
determining the one or more patches to be masked based at least in part on the available bandwidth, and
setting a compression ratio for encoding of the difference dataset into the second data based at least in part on the available bandwidth.

13. The method of claim 9, further comprising:
applying a data segmentation algorithm to the input data to detect a set of features in the data;
classifying at least some features of the detected set of features;
and at least one of:
determining the subset of patches from the set of patches based at least in part on the classified features, or
determining the one or more patches to be masked based at least in part on the classified features.

14. The method of claim 9, further comprising:
determining a set of labels, each label associated with a patch from the set of patches and indicating data content of said patch;
and at least one of:
determining the subset of patches from the set of patches based at least in part of the set of labels, or
determining the one or more patches to be masked based at least in part of the set of labels.

15. One or more non-transitory computer-readable media storing instructions executable by one or more processors, wherein the instructions, when executed, cause the one or more processors to perform operations comprising:
determining, by an encoder machine-learned (ML) model and based at least in part on input data, a set of encoding vectors comprising one or more encoding vectors, the input data determined based at least in part on importance of the input data to control of an autonomous vehicle;
determining, by a decoder ML model and based at least in part on the set of encoding vectors, reconstructed data;
comparing the reconstructed data with the input data;
determining, based at least in part on the comparing, a difference dataset between the reconstructed data and the input data;
determining first data based at least in part on the set of encoding vectors;
determining second data based at least in part on the difference dataset; and
transmitting the first data and the second data.

16. The one or more non-transitory computer-readable media of claim 15, wherein the operations further comprise:
receiving sensor data captured by at least one sensor of an autonomous vehicle; and
determining the input data based at least in part on the sensor data.

17. The one or more non-transitory computer-readable media of claim 15, wherein the operations further comprise:
determining, based at least in part on the input data, a set of patches of the input data;
determining, based at least in part on the set of patches, a subset of patches from the set of patches; and
determining, by the encoder ML model and based at least in part on the subset of patches, the set of encoding vectors.

18. The one or more non-transitory computer-readable media of claim 17, wherein the operations further comprise:
determining one or more patches to be masked from the set of patches, wherein the difference dataset contains masked portions based at least in part on the determined one or more patches to be masked, wherein a masked portion refers to one of:
a subset of the difference dataset being an empty set,
a subset of the difference dataset with predefined data, and
a subset of the difference dataset comprising data corresponding to a lossy version of input data of the one or more patches to be masked.

19. The one or more non-transitory computer-readable media of claim 17, wherein the operations further comprise:
determining a set of labels, each label associated with an encoding vector encoded from a patch from the set of patches and indicating data content of said patch; and
determining a portion of the first data based at least in part by tokenizing each label of the set of labels.

20. The one or more non-transitory computer-readable media of claim 18, wherein the operations further comprise:
determining a set of labels, each label associated with a patch from the set of patches and indicating data content of said patch;
and at least one of:
determining the subset of patches from the set of patches based at least in part of the set of labels, and
determining the one or more patches to be masked based at least in part of the set of labels.

* * * * *